United States Patent
Skiotys et al.

(10) Patent No.: US 9,966,750 B2
(45) Date of Patent: May 8, 2018

(54) ANTI-BALLISTIC PASSTHROUGHS

(71) Applicant: TenCate Advanced Armor USA, Inc., Goleta, CA (US)

(72) Inventors: Dainius Skiotys, Blacklick, OH (US); Marc Taylor, Goleta, CA (US); Brad Kollmann, Goleta, CA (US); Erik Johnson, Blacklick, OH (US)

(73) Assignee: TenCate Advanced Armor USA, Inc., Newark, OH (US)

( * ) Notice: Subject to any disclaimer, the term of this patent is extended or adjusted under 35 U.S.C. 154(b) by 0 days. days.

(21) Appl. No.: 15/370,543

(22) Filed: Dec. 6, 2016

(65) Prior Publication Data

US 2017/0163019 A1  Jun. 8, 2017

Related U.S. Application Data

(60) Provisional application No. 62/263,859, filed on Dec. 7, 2015.

(51) Int. Cl.
| | |
|---|---|
| *H02G 3/22* | (2006.01) |
| *H02G 15/013* | (2006.01) |
| *H01Q 1/27* | (2006.01) |
| *F41H 5/26* | (2006.01) |
| *F41H 7/04* | (2006.01) |

(52) U.S. Cl.
CPC .............. *H02G 3/22* (2013.01); *F41H 5/26* (2013.01); *F41H 7/044* (2013.01); *H02G 15/013* (2013.01)

(58) Field of Classification Search
CPC ........... H02G 3/22; H02G 15/013; H01Q 1/27
See application file for complete search history.

(56) References Cited

U.S. PATENT DOCUMENTS

| | | | | |
|---|---|---|---|---|
| 2,434,638 | A | | 1/1948 | Bryers |
| 3,809,798 | A | * | 5/1974 | Simon .................. H02G 3/0633 174/135 |
| 4,115,779 | A | * | 9/1978 | Dantzler ................ H01Q 1/084 343/715 |
| 4,184,160 | A | | 1/1980 | Affronti |
| 4,790,774 | A | * | 12/1988 | White ...................... H01R 9/05 439/551 |
| 5,252,985 | A | * | 10/1993 | Christinsin ............ H01Q 1/084 343/715 |

(Continued)

FOREIGN PATENT DOCUMENTS

| | | |
|---|---|---|
| DE | 7732584 U1 | 5/1978 |
| DE | 10247261 A1 | 4/2004 |
| FR | 2988923 A1 | 10/2013 |

OTHER PUBLICATIONS

International Patent Application No. PCT/US2016/065130, Search Report and Written Opinion dated Aug. 23, 2017.

*Primary Examiner* — William H Mayo, III
*Assistant Examiner* — Hiram E Gonzalez
(74) *Attorney, Agent, or Firm* — Kilpatrick Townsend & Stockton LLP; Dean W. Russell

(57) ABSTRACT

Feedthroughs for antenna or other cables are described. At least some versions of the feedthroughs may, but need not necessarily, be employed as part of passive armor systems for lightweight vehicles used by, for example, special operations forces of the United States military. The feedthroughs may provide non-linear cable paths in areas near openings of vehicle hulls and avoid creating direct pathways for bullets to enter the openings.

18 Claims, 5 Drawing Sheets

(56) References Cited

U.S. PATENT DOCUMENTS 5,563,378 A * 10/1996 Uchida ................ H02G 3/0633
                                                            174/135
7,626,118 B1 * 12/2009 Capozzi ................ H02G 3/088
                                                            174/50

* cited by examiner

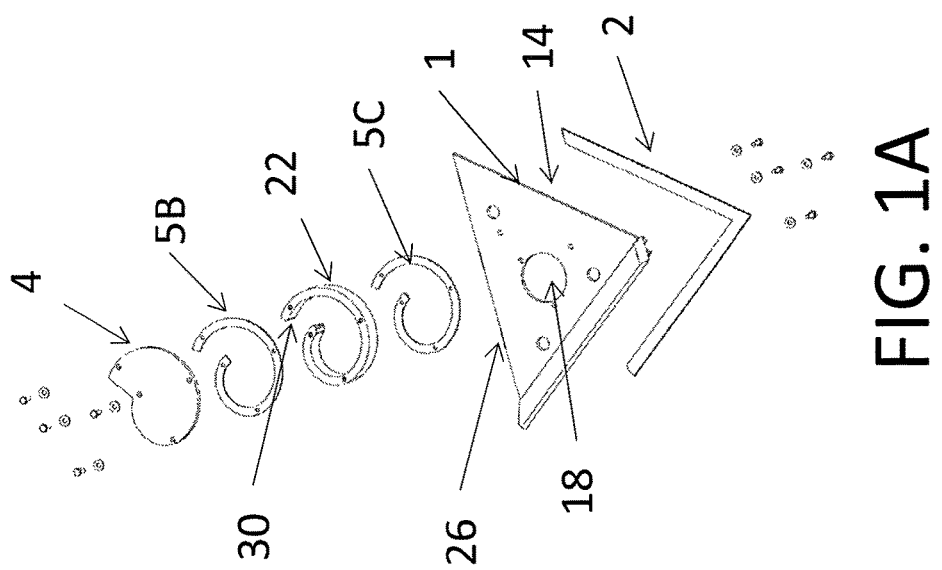

ANTI-BALLISTIC PASSTHROUGHS

CROSS-REFERENCE TO RELATED APPLICATION

This application claims the benefit of and priority to U.S. Provisional Patent Application Ser. No. 62/263,859, filed Dec. 7, 2015, and having the same title as appears above, the entire contents of which application are hereby incorporated herein by this reference.

FIELD OF THE INVENTION

The present invention relates to passthroughs (feedthroughs) and more particularly, although not necessarily exclusively, to assemblies allowing wire, cable, or other structures to enter or exit vehicles in manners mitigating vulnerability of the vehicles to ballistics or other projectiles while being environmentally sealed.

BACKGROUND OF THE INVENTION

U.S. Pat. No. 2,434,638 to Bryers illustrates a feedthrough for an antenna. To utilize the feedthrough, "an opening is cut through the skin of [an airplane] of the same size as the greater interior diameter of [a] cone." See Bryers, col. 3, 11. 8-10. A threaded rod extends centrally through the opening perpendicular to the plane thereof. Nuts and washers may be placed about the rod, with an antenna tightened between them so as to connect the antenna and the rod electrically. See id., 11. 15-37; FIGS. 1-3.

By contrast, U.S. Pat. No. 4,184,160 to Affronti discloses a surface mounting assembly intended to position an antenna on a roof of a vehicle without creating a hole in the roof. The assembly clamps to edges of the roof. Bolted to the assembly is a housing having an opening through which an antenna extends upwardly, again perpendicular to the plane of the opening. The housing also contains another feedthrough permitting a cable associated with the antenna to pass. After exiting the housing, the cable is hooked to the assembly and continues into the vehicle in an unspecified manner. See Affronti, col. 2, 11. 27-31; col. 3, 1. 33 to col. 4,1. 16.

Neither the feedthrough of the Bryers patent nor the assembly of the Affronti patent appears intended for use in hostile environments. Consequently, neither structure is concerned with mitigating vulnerability of the associated vehicle to projectiles striking in the area of either the opening in the aircraft skin, as in the Bryers patent, or whatever (unspecified) opening allows the cable to enter the vehicle of the Affronti patent. Moreover, neither patent discusses possible adverse effects of turning a cable through a ninety-degree angle: Indeed, FIG. 1 of the Affronti patent illustrates the cable turning through ninety degrees while retained on the surface mounting assembly, and the Bryers patent contemplates use of a separate rod to avoid any ninety-degree turn of the antenna.

SUMMARY OF THE INVENTION

The present invention provides innovative feedthroughs. The feedthroughs are especially (although not exclusively) beneficial for passing antenna (or other) cables through hulls of vehicles configured for use in hostile environments. At least some versions of the feedthroughs may be employed as part of passive armor systems for lightweight vehicles used by, for example, special operations forces of the United States military.

In particular, the inventive feedthroughs provide non-linear cable paths in areas near openings of vehicle hulls. Rather than causing a cable or rod to exit an opening perpendicular to the plane thereof, the present feedthroughs cause cables to exit generally parallel to these planes—i.e. generally along exterior hull surfaces. No direct pathway thus exists for a bullet to enter an opening of the vehicle hull, reducing ballistic vulnerability of the vehicle caused by the existence of the feedthrough. Moreover, the curved path followed by the cable through the inventive feedthrough prevents the cable from making any sharp ninety-degree turn, avoiding adverse conductivity or other consequences sometimes associated with such sharp turns.

BRIEF DESCRIPTION OF THE DRAWINGS

FIG. 1A is an exploded perspective view of an exemplary feedthrough of the present invention.

DETAILED DESCRIPTION

Figure 1B:
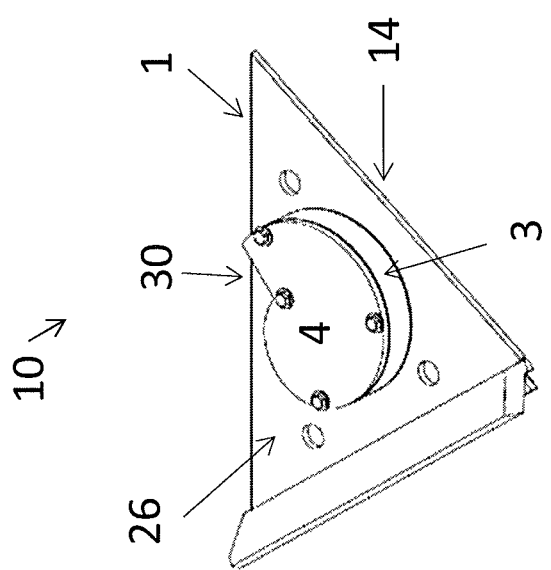
FIG. 1B is a perspective view of the feedthrough of FIG. 1A.
Figure 1C:
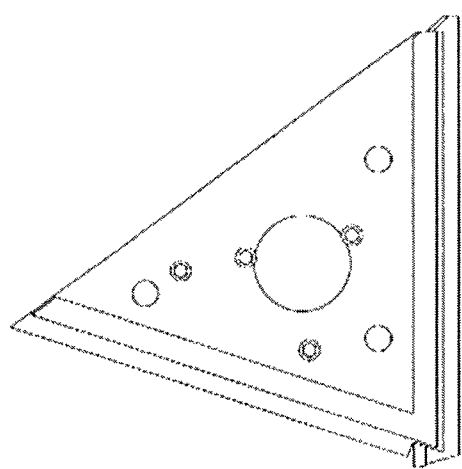
FIG. 1C is a plan view of a plate of the feedthrough of FIG. 1A.
Figure 2:
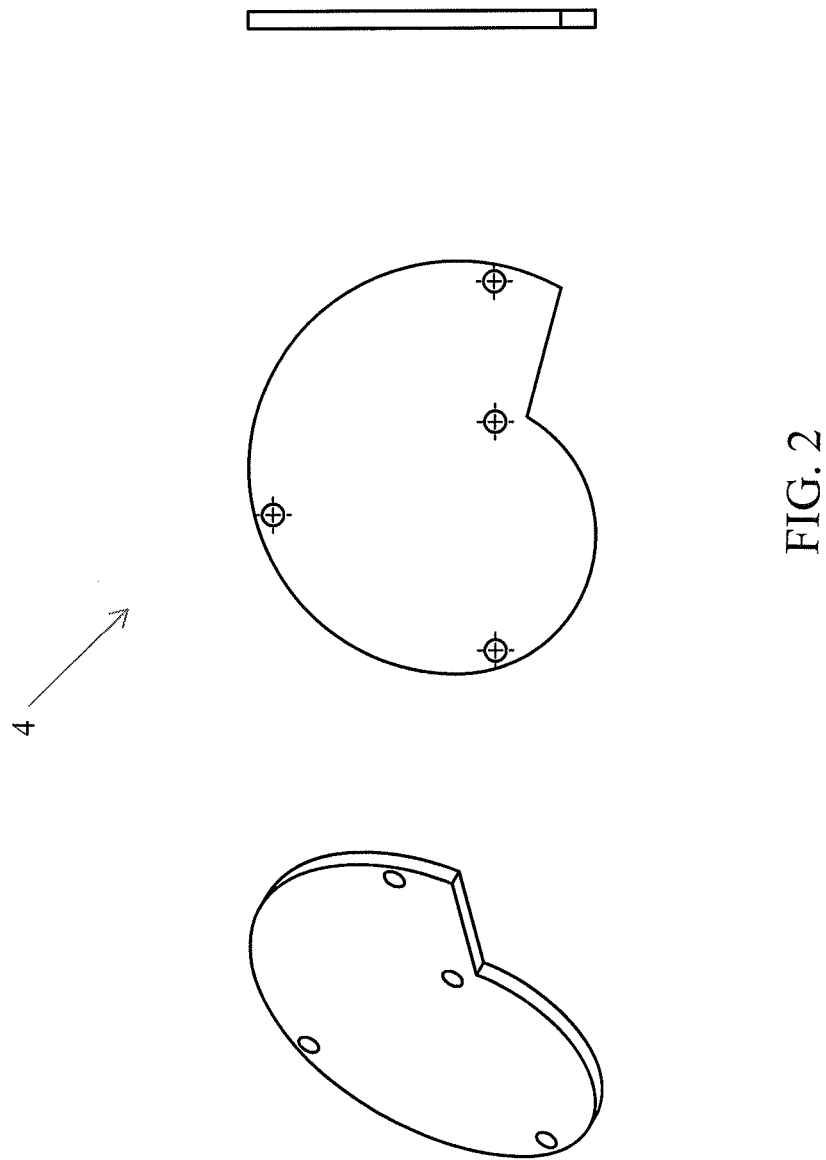
FIG. 2 are perspective, plan, and side views of a cover plate of the feedthrough of FIG. 1A.

FIGS. 1A-C, 2, and 3 illustrate an exemplary type of feedthrough 10. As shown especially in the exploded view of FIG. 1A, feedthrough 10 may comprise at least plate 1, guide 3, and cover plate 4. Plate 1 is depicted as having a planar, triangular section 14 including an opening 18. In use, section 14 preferably is configured to attach to an external surface of a vehicle hull, with environmentally-sealed opening 18 aligned with a corresponding opening through the hull to permit passage of antenna cable or another (elongated, flexible) structure. Section 14 need not necessarily be either planar or triangular, however; in certain situations, moreover, plate 1 need not necessarily even be present. Indeed, plate 1 could itself represent a portion of an external surface of the vehicle hull, in which case feedthrough 10 would include guide 3 and cover plate 4.

Figure 3:
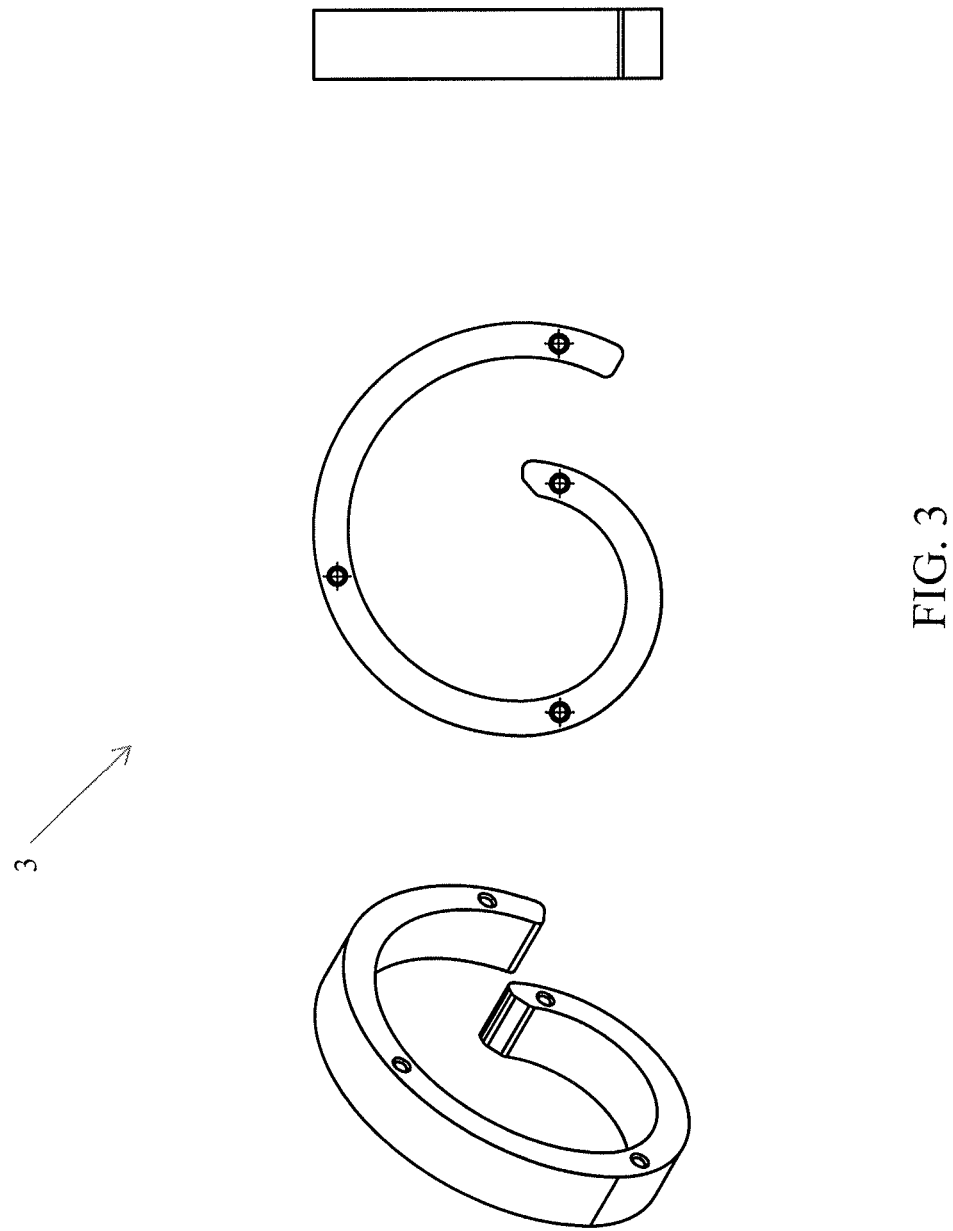
FIG. 3 are perspective, plan, and side views of a guide of the feedthrough of FIG. 1A.

FIGS. 1A-B and 3 show a sample of guide 3. As detailed in FIG. 3, guide 3 preferably has a cross-section in the form of (or at least similar to) a spiral curve. In some versions, first portion 22 of guide 3 has diameter approximately equal to the diameter of opening 18. Guide 3 may be fastened to external surface 26 of plate 1 so that first portion 22 aligns with, and thereby surrounds, much of opening 18.

Cover plate 4 may be attached atop anti-ballistic guide 3. Cover plate 4 also may be anti-ballistic, preferably is generally planar and solid, and may be positioned generally parallel to plate 1. However, because guide 3 is not of circular cross-section, space 30 exists covered by plate 4. Cable passing into space 30 thus may be guided by guide 3 in a somewhat-circular path and thence pass through opening 18 into the vehicle. This passage occurs without the cable making any sharp, ninety-degree turn.

By contrast, a bullet or other projectile cannot directly enter opening 18 because of the presence of cover plate 4. Furthermore, any bullet or projectile entering space 30, because of its linear velocity, is unlikely to be able to turn so as to pass through opening 18. Consequently, feedthrough 10 has anti-ballistic effect, reducing the likelihood of a bullet entering a vehicle through an opening intended for passage of an antenna or other cable.

Also shown in FIG. 1A are optional lower and upper foam strips 5A and 5B, respectively. If present, they may be shaped similar to the cross-sectional shape of guide 3. Strips 5A and 5B may be placed immediately beneath and atop guide 3 to facilitate assembly of feedthrough 10, for shock-absorbing purposes, for environmental sealing, or otherwise. Foam tape 2 also optionally may be used to facilitate attachment of feedthrough 10 to a vehicle.

The foregoing is provided for purposes of illustrating, explaining, and describing embodiments of the present invention. Modifications and adaptations to these embodiments will be apparent to those skilled in the art and may be made without departing from the scope or spirit of the invention. The contents of the Bryers and Affronti patents are incorporated herein in their entireties by this reference.

What is claimed is:

1. A feedthrough configured to facilitate passage of a cable through an opening of a hull, comprising:
   a. a guide configured to (i) surround at least a portion of the opening and (ii) guide the cable in a spiral path to or from the opening; and
   b. a cover plate configured to attach to the guide.

2. A feedthrough according to claim 1 further comprising a plate configured to attach to (i) the hull and (ii) the guide.

3. A feedthrough according to claim 2 in which the plate comprises a solid section having an opening therein.

4. A feedthrough according to claim 3 in which the plate is attached to the hull with the opening of the plate aligned with the opening of the hull.

5. A feedthrough according to claim 1 in which the guide has a spirally-curved cross-section.

6. A feedthrough according to claim 5 in which the guide has a first portion aligned with the opening of the hull.

7. A feedthrough according to claim 4 in which the guide has a spirally-curved cross-section.

8. A feedthrough according to claim 7 in which the guide has a first portion aligned with the opening of the plate.

9. A feedthrough according to claim 8 in which the opening of the plate has a diameter and the first portion of the guide has a diameter approximately equal to the diameter of the opening of the plate.

10. A feedthrough according to claim 1 in which the guide and cover plate form a space through which the cable passes.

11. A feedthrough according to claim 10 in which the space is configured so as to guide the cable to or from the opening of the hull.

12. A feedthrough according to claim 1 in which (a) the hull has an exterior surface and (b) the guide is configured to guide the cable along the exterior surface.

13. A feedthrough according to claim 12 in which the guide defines an exit for the cable generally parallel to the exterior surface.

14. A vehicle comprising:
   a. a hull having an opening; and
   b. an anti-ballistic feedthrough for a cable, comprising:
      i. a guide configured to (A) surround at least a portion of the opening and (B) guide the cable in a spiral path to or from the opening; and
      ii. a cover plate configured to attach to the guide.

15. A vehicle according to claim 14 in which the cover plate is attached atop the guide, further comprising a plate (i) attached to the hull and (ii) having an opening aligned with the opening of the hull.

16. A vehicle according to claim 15 in which the guide has a spirally-curved cross-section.

17. A vehicle comprising:
   a. a hull having (i) an exterior surface and (ii) an opening;
   b. a cable; and
   c. an anti-ballistic feedthrough for the cable, comprising:
      i. a guide (A) configured to (1) surround the opening and (2) guide the cable to or from the opening in a non spiral path along the exterior surface and (B) defining an exit for the cable generally parallel to the exterior surface; and
      ii. a solid cover plate attached to the guide.

18. A feedthrough configured to facilitate passage of a cable through an opening of an exterior surface of a hull, comprising:
   a. a guide configured to (i) surround at least a portion of the opening, (ii) guide the cable in a spiral path to or from the opening along the exterior surface without making any ninety-degree turn, and (iii) define an exit for the cable generally parallel to the exterior surface; and
   b. a cover plate configured to attach to the guide.

* * * * *